Figure 5:
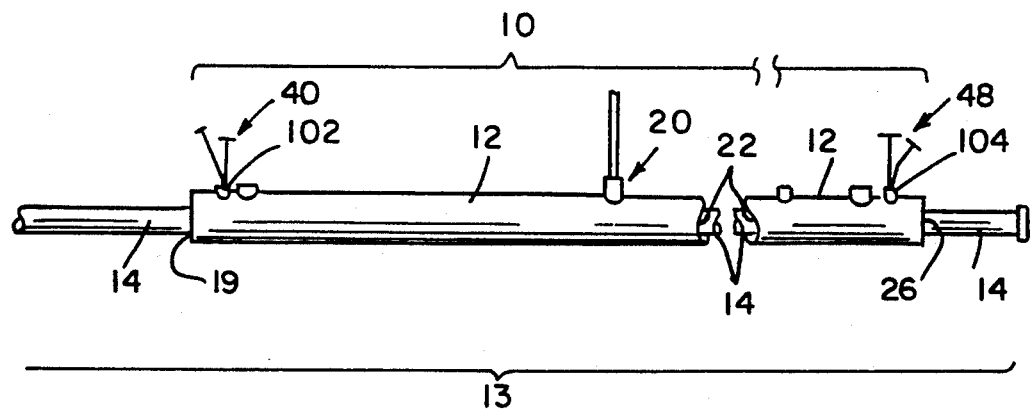
Figure 6:
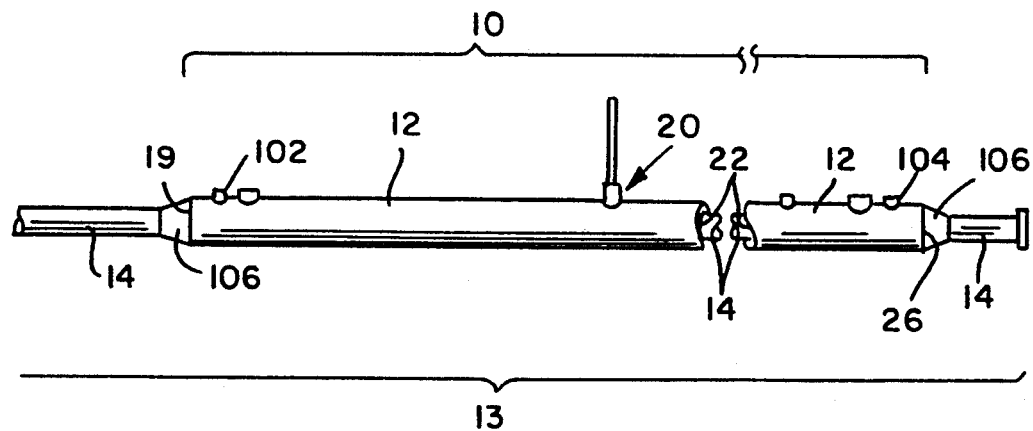

United States Patent [19]

Martin et al.

[11] Patent Number: 5,062,207
[45] Date of Patent: Nov. 5, 1991

[54] METHOD OF MAKING LIVE GAS MAIN INSERTIONS

[76] Inventors: Luther W. Martin, 1221 Julie Dr., Champaign, Ill. 61821; Richard L. Smith, R.R. 2 - Box 82A, Edwardsville, Ill. 62025

[21] Appl. No.: 424,609

[22] Filed: Oct. 20, 1989

[51] Int. Cl.⁵ .................................. F16L 55/18
[52] U.S. Cl. ....................... 29/890.14; 29/402.03; 138/97
[58] Field of Search ............. 29/890.14, 402.03; 138/97

[56] References Cited

U.S. PATENT DOCUMENTS

| | | | |
|---|---|---|---|
| 3,688,801 | 9/1972 | Rohrer | 138/97 |
| 3,845,789 | 11/1974 | Rohrer | 138/97 |
| 4,009,732 | 3/1977 | Martin et al. | 138/97 |
| 4,090,534 | 5/1978 | Martin et al. | 138/97 |
| 4,252,152 | 2/1981 | Martin et al. | 138/97 |
| 4,253,497 | 3/1981 | Martin et al. | 138/97 |
| 4,413,655 | 11/1983 | Brown | 138/97 |
| 4,437,494 | 3/1984 | Soper et al. | 138/97 |

*Primary Examiner*—Irene Cuda
*Attorney, Agent, or Firm*—Barnes & Thornburg

[57] ABSTRACT

A method for inserting a smaller cross sectional area, higher pressure fluid conduit or "main" into a larger cross sectional area, lower pressure fluid main, includes inserting a length of smaller diameter gas main into a length of larger diameter gas main while the larger diameter gas main remains pressurized with the gas. The method includes providing a parallel gas pathway from a section of larger diameter main upstream toward the gas supply from the length of larger diameter main into which the smaller diameter main is to be inserted.

5 Claims, 2 Drawing Sheets

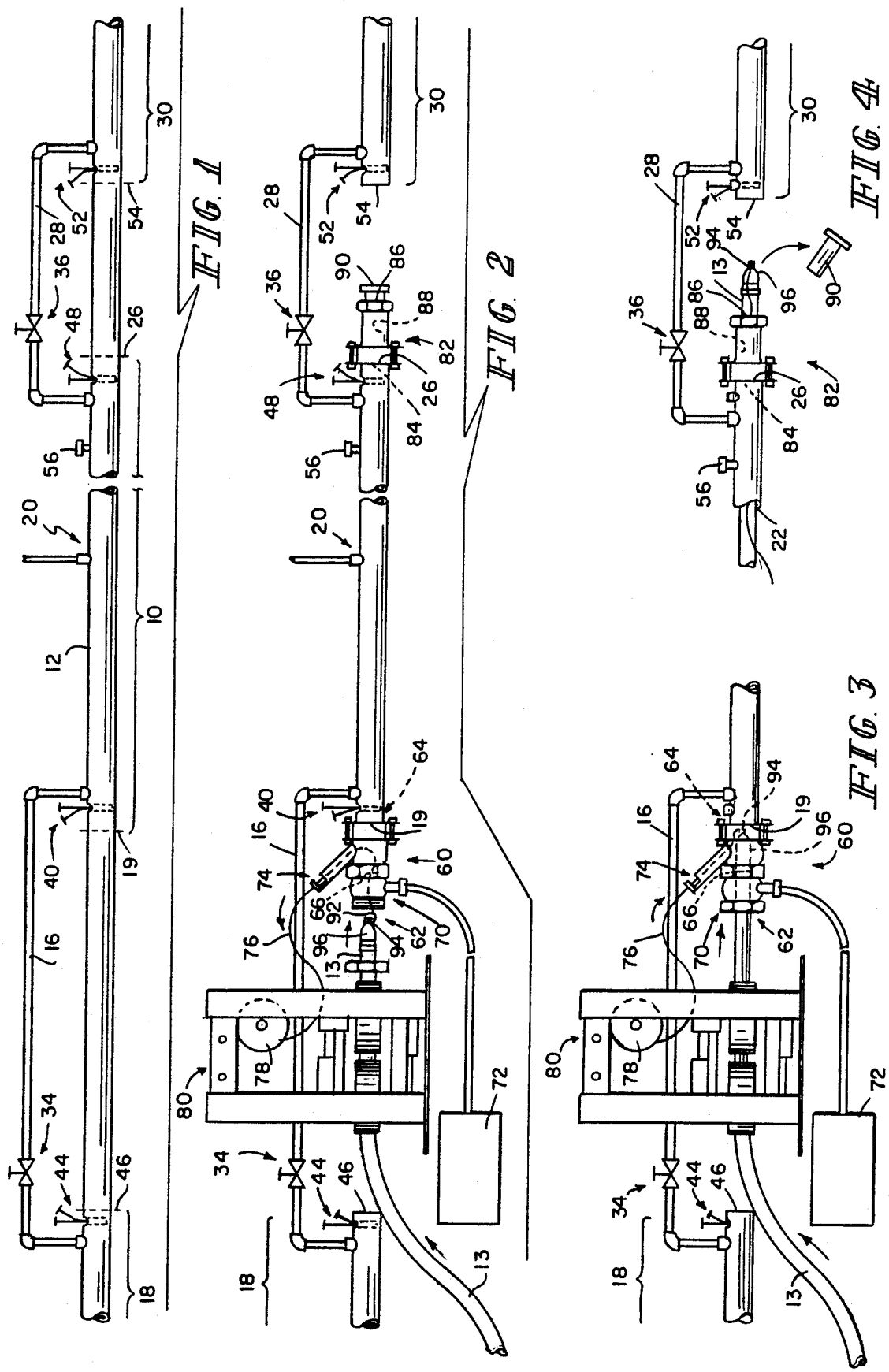

METHOD OF MAKING LIVE GAS MAIN INSERTIONS

This invention relates to methods for inserting a smaller cross sectional area, higher pressure fluid conduit or "main" into a larger cross sectional area, lower pressure fluid main. It is disclosed in the context of inserting a smaller diameter, higher pressure gas main into a larger diameter lower pressure gas main, but is believed to be useful in other areas as well.

Ordinarily, a low pressure gas main will be cast iron and will have been in service for several decades resulting in some corrosion and, perhaps, leakage of natural gas.

The benefits of, and techniques and equipment for, inserting a higher pressure, usually polyethylene or other suitable resin, main into the lower pressure cast iron main have already been explored in considerable detail. The following patents are listed as exemplary only and no representation is made or intended that they are exhaustive on the current state of this art: Rohrer U.S. Pat. Nos. 3,688,801 and 3,845,789; and Martin et al. U.S. Pat. Nos. 4,009,732; 4,090,534; 4,252,152; and 4,253,497. These patents describe in detail why such live insertions are necessary and desirable. They also describe in detail various techniques for conducting such insertions. It is an object of the present invention to provide an improved and simplified technique for conducting such live insertions.

According to the invention, a method is provided for inserting a length of smaller diameter gas main into a length of larger diameter gas main while the larger diameter gas main remains pressurized with gas and continues to serve customers. The method consists essentially of the following steps: Providing a parallel gas pathway from a section of larger diameter main upstream toward the gas supply from the length of larger diameter main into which the smaller diameter main is to be inserted. This permits the supply of gas from the upstream section of larger diameter gas main to be continued during the process, as well as permits the supply of gas from the upstream section of larger diameter gas main to an annular space between the length of larger diameter gas main and the length of smaller diameter gas main to continue after the process is complete; Placing a first temporary seal in the length of larger diameter gas main between the point at which the parallel pathway enters the length of larger diameter gas main and the upstream end of the length of larger diameter gas main; Separating the length of larger diameter gas main from the upstream section of larger diameter gas main to leave exposed an upstream end of the length of larger diameter main; Placing on the exposed end of the length of larger diameter main either an entry end fitting or an exit end fitting. Each of the entry end fitting and exit end fitting has an inner end for joining to an exposed end of the length of larger diameter main, an outer end, and a passageway having the diameter of the smaller diameter gas main; Placing a second temporary seal upstream from the downstream end of the length of larger diameter gas main; Preparing the downstream end of the length of larger diameter gas main to receive the other of the entry end fitting and the exit end fitting; Mounting said other fitting on the downstream end of the length of larger diameter gas main; capping the end of the length of smaller diameter gas main which is to be inserted first into the length of larger diameter gas main; Inserting the capped end of the length of smaller diameter main into the outer end of the entry end fitting; Removing the first temporary seal; Pushing the length of smaller diameter main through the length of larger diameter main and through the outer end of the exit end fitting; Placing substantially permanent seals at the upstream and downstream ends of the length of larger diameter gas main between the inner sidewall of the length of larger diameter gas main and the outer sidewall of the length of smaller diameter gas main; And removing the entry and exit end fittings.

According to an illustrative embodiment of the invention, the step of placing an entry end fitting on one end of the length of larger diameter gas main comprises the step of placing on the end of the length of larger diameter gas main an entry end fitting provided with a port. The port permits an inert lubricant to be introduced into the passageway of the entry end fitting around the smaller diameter gas main to seal the smaller diameter gas main to the passageway of the entry end fitting and lubricate the smaller diameter gas main as it travels through the passageway of the entry end fitting, down the length of larger diameter gas main, and out the passageway of the exit end fitting. The illustrative method further comprises the step of supplying the lubricant through the port as the length of smaller diameter main is being pushed through the entry end fitting, through the length of larger diameter main, and out the exit end fitting.

Further according to an illustrative embodiment of the invention, the step of inserting the capped end of the length of smaller diameter main into the outer end of the entry end fitting comprises the steps of attaching an end of a tracer wire to the capped end and simultaneously inserting the capped end and tracer wire into the outer end of the entry end fitting. The step of pushing the length of smaller diameter main through the length of larger diameter main and through the outer end of the exit end fitting includes the step of threading the tracer wire through the length of larger diameter main and through the outer end of the exit end fitting so that the tracer wire is coextensive with the length of smaller diameter main.

Additionally, according to an illustrative embodiment of the invention, the step of placing an entry end fitting on one end of the length of larger diameter gas main comprises the step of placing on the end of the length of larger diameter gas main an entry end fitting provided with a tracer wire entry port for permitting tracer wire to be fed into the entry end fitting through a port other than the outer end of the passageway.

Additionally, according to an illustrative embodiment of the invention, the step of preparing the downstream end of the length of larger diameter gas main to receive the said other of the entry end fitting and the exit end fitting comprises the steps of providing a second parallel gas pathway from the downstream end of the length of larger diameter gas main to a section of larger diameter gas main downstream from the downstream end of the length of larger diameter gas main. This permits the supply of gas from the length of larger diameter gas main to the downstream section of larger diameter gas main to continue during the process. It also permits the supply of gas from the annular space between the length of larger diameter gas main and the length of smaller diameter gas main to the downstream section of larger diameter gas main to continue after the process is completed.

The invention may best be understood by referring to the following description and accompanying drawings which illustrate the invention. In the drawings:

FIGS. 1–6 illustrate fragmentary, dragrammatic, side elevational views of the various steps of a process according to the present invention.

Referring now particularly to FIG. 1, the length 10 of live, larger diameter gas main 12 into which a length 13 of smaller diameter gas main 14 is to be inserted is selected. Frequently length 10 of live main 12 will be located at the downstream end of a run of main, that is, the end farthest away from a gas source. However, that is not essential, and in the process as described herein, it is assumed that length 10 of main 12 is not at the farthest downstream end of a run of main 12.

After length 10 is selected, a parallel gas pathway 16 is provided from a section 18 of larger diameter main 12 upstream toward the gas source from the upstream end 19 of length 10 of main 12. This will permit the supply of gas from upstream section 18 to be continued as the process is carried out so that services, such as service 20, tapped to length 10 of main 12 are not disturbed during the insertion. Additionally, parallel pathway 16 permits the supply of gas from upstream section 18 to continue to the annular space 22 which will result between the length 10 of larger diameter main 12 and the length 13 of smaller diameter main 14 after the process is completed.

As was mentioned above, the process may be conducted on the downstream end of a larger diameter main 12. However, the process is explained in the context of an insertion into a length 10 of larger diameter main 12 which is not at the downstream end of a larger diameter main. Consequently, the process further optionally includes preparing the downstream end 26 of the length 10 of larger diameter main 12 by providing a second parallel gas pathway 28 from the downstream end 26 of length 10 of larger diameter main 12 to a downstream section 30 of larger diameter main 12. This optional step permits the supply of gas from the length 10 of larger diameter main 12 to downstream section 30, where such a downstream section 30 exists, to continue during the process. It also permits the supply of gas from the annular space 22 to the downstream section 30 to continue, where desired, after the process is completed. Of course, appropriate valves 34, 36, respectively, gauges and other hardware can be provided for parallel pathways 16, 28 as required by a particular installation.

In the next phase of the process, a first temporary "bag" or other appropriate seal 40 is lowered adjacent the upstream end 19 of length 10 of main 12. At the same time, a temporary bag seal 44 can be lowered adjacent the downstream end 46 of upstream section 18 to prevent the escape of gas therefrom during subsequent steps of the process. A second temporary bag seal 48 is lowered adjacent the downstream end 26 of length 10 of main 12. At the same time, a temporary bag seal 52 can be lowered adjacent the upstream end 54 of downstream section 30 where such a section exists. A sight glass 56 can also be inserted into length 10 of main 12 near the downstream end 26 thereof as a convenience for subsequent steps in the process.

Next, and with reference particularly to FIG. 2, the upstream and downstream ends 19, 26 respectively, are separated from the downstream end 46 of the upstream section 18 and, where one exists, the upstream end 54 of downstream section 30, respectively. An entry end fitting 60 having an outer end opening 62, an inner end opening 64 and a passageway 66 extending therebetween is Placed on one of ends 19, 26, illustratively, end 19. Passageway 66 has a cross-section substantially the same shape, illustratively circular, and size as the cross section of the length 13 of smaller diameter main 14. Entry end fitting 60 is mounted on end 19 with its inner end opening 64 facing end 19. Entry end fitting 60 also has a lubricant chamber 70 for filling with an inert sealing and lubricating composition from a source 72, illustrated diagrammatically, as the length 13 of smaller diameter main 14 is inserted through outer end opening 62, passageway 66 and inner end opening 64 into the upstream end 19 of length 10 of main 12. Entry end fitting 60 also includes a tracer wire entry port 74 for feeding tracer wire 76 from a spool 78 thereof provided on a pipe pusher 80 into entry end fitting 60 in a manner and for a purpose which will be described subsequently.

An exit end fitting 82 having an inner end opening 84, an outer end opening 86 and a passageway 88 extending therebetween is mounted on the other of ends 19, 26, illustratively, the downstream end 26 of length 10 of main 12. Passageway 88 has a cross sectional size and shape substantially the same as the length 13 of smaller diameter main 14. Fitting 82 is mounted on end 26 with its inner end opening 84 facing end 26. Inner end opening 84 is somewhat flared or bell shaped for a reason which will be explained. Outer end opening 86 is closed by a plug 90 which extends into passageway 88. Plug 90 illustratively is covered with the same lubricant which is used to lubricate and seal length 13 of main 14 in passageway 66 of entry end fitting 60. This permits plug 90 to seal passageway 88 to prevent the leakage of gas therefrom during the process, but at the same time to permit plug 90 to be pushed from outer end opening 86 without too much force by length 13 of main 14 as length 13 of main 14 is pushed along the length 10 of main 12 by pipe pusher 80.

Next, the free end 92 of tracer wire 76 is fed through tracer wire entry port 74 and back through passageway 66, grease chamber 70 and out of entry end fitting 60 through outer end opening 62. Free end 92 of tracer wire 76 is attached, illustratively by a screw 94 provided on a nose cone 96, to the front end of the nose cone 96. Nose cone 96 illustratively is an expanding plug-type nose cone having rubber or other elastomeric grommets captured between disks or nuts which, when threaded relatively toward each other, cause the grommets to expand radially and plug the first end 100 of length 13 of main 14 to be inserted into the outer end opening 62 of entry end fitting 60. It may be desirable, if length 13 of main 14 has been coiled on a spool for a substantial length of time, to attach a short, for example, ten foot (3 meters), straight length of main 14 to the first end of length 13 before nose cone 96 is placed into main 14. This is done as a precaution against the first end of length 13 of main 14 not passing readily through fittings 60, 82 or length 10 of main 12, owing to a curved "set" that length 13 of main 14 may have taken while on the spool.

Referring to FIG. 3, the first end of length 13 of main 14, equipped with nose cone 96, is then placed into the outer end 62 of entry end fitting 60, the slack on tracer wire 76 is taken up, illustratively by rewinding spool 78, thereby pulling tracer wire 76 back through tracer wire entry port 74, and lubricant chamber 70 is filled with lubricant until some of the lubricant can be seen around the length 13 of main 14 at outer end opening 62. At this time, both of bag seals 40, 48 are "raised", or deflated, to permit the insertion process to continue. The pipe pusher 80 is then started, feeding the length 13 of main 14 through the length 10 of main 12. At the point at which nose cone 96 first appears in sight glass 56, pipe pusher 80 can be slowed, as this step of the insertion is nearing completion.

Referring to FIG. 4, as nose cone 96 reaches exit end fitting 82, the bell or flared shape of inner end opening 84 intercepts it and guides it, and the first end of length 13 of main 14 which it is plugging, into passageway 88. Nose cone 96 forces plug 90 from outer end 86 of exit end fitting 82 as the first end of length 13 of main 14 takes the place of plug 90, plugging passageway 88.

Referring now to FIG. 5, a hardenable foam is injected through the openings vacated by bag seals 40, 48 around the now-inserted length 13 of main 14 after length 13 is pressure tested, for example, with nitrogen. The entry and exit end fittings 60, 82, respectively, can then be removed from the ends of the length 10 of main 12, and funnel shaped molds (not shown) having central openings which accommodate the protruding ends of length 13 of main 14 can be placed over the ends of length 10 of main 12. An additional quantity of hardenable foam can be dispensed through the funnel shape molds into the annular space. Enough of the foam is dispensed to insure that the funnel shaped molds are filled, providing a finish as illustrated at 106 in FIG. 6 at both ends of length 10 of main 12 around length 13 of main 14. All of the openings which have been placed in the length 10 of main 12 can then be plugged, for example, with threaded plugs, and the finish 106 on ends 19, 26 can be completed with durable tape as desired.

The ends of length 13 of main 14 can then be capped or tied to higher pressure gas service using known techniques. The switchover of individual customers from gas supply through annular space 22 to gas supply through length 13 of main 14 can be achieved later, at the gas utility's convenience and substantially without any interruption of customer service, using, for example, the technique described in U.S. Pat. No. 4,009,732.

What is claimed is:

1. A method of inserting a length of smaller cross-section gas main into a first length of larger cross-section gas main while the first length of main remains pressurized, the method consisting essentially of the steps of providing a parallel gas pathway from a second length of main upstream toward the gas supply from the first length of main into which the smaller cross-section main is to be inserted, placing a first temporary seal in the first length of main between the point at which the parallel pathway enters the first length of main and the upstream end of the first length of main, separating the first length of main from the second length of main to leave exposed an upstream end of the first length of main, placing on the exposed end of the first length of main one of an entry end fitting and an exit end fitting, each of the entry end fitting and exit end fitting having an inner end for joining to an exposed end of the first length of main, an outer end, and a passageway having the same cross-section as the length of the smaller cross-section main, placing a second temporary seal upstream from the downstream end of the first length of main, preparing the downstream end of the first length of main to receive the other of the entry end fitting and the exit end fitting, mounting said other fitting on the downstream end of the first length of main, removing the second temporary seal, closing the end of the length of smaller cross-section main which is to be inserted first into the first length of main, inserting the closed end of the length of smaller cross-section main into the outer end of the entry end fitting, pushing the length of smaller cross-section main through the first length of main and through the outer end of the exit end fitting, placing permanent seals at the upstream and downstream ends of the first length of main between the inner sidewall of the first length of main and the outer sidewall of the length of smaller cross-section main, and removing the entry and exit end fittings.

2. The method of claim 1 wherein the step of placing an entry end fitting on one end of the first length of main comprises the step of placing on the end of the first length of main an entry end fitting provided with a lubricant port for permitting a lubricant to be introduced into the passageway of the entry end fitting around the smaller cross-section main and further comprising the step of supplying the lubricant through the lubricant port as the length of smaller cross-section main is being pushed through the entry end fitting, through the first length of main, and out the exit end fitting.

3. The method of claim 1 wherein the step of inserting the closed end of the length of smaller cross-section main into the outer end of the entry end fitting comprises the steps of attaching an end of a tracer wire to the closed end of the length of smaller cross-section main and simultaneously inserting the closed end and tracer wire into the outer end of the entry end fitting, and the step of pushing the length of smaller cross-section main through the first length of main and through the outer end of the exit end fitting includes the step of threading the tracer wire through the first length of main and through the outer end of the exit end fitting so that the tracer wire is coextensive with the length of smaller cross-section main.

4. The method of claim 3 wherein the step of placing an entry end fitting on one end of the first length of main comprises the step of placing on said one end of the first length of main an entry end fitting provided with a tracer wire entry port for permitting tracer wire to be fed into the entry end fitting.

5. The method of claim 4 wherein the step of preparing the downstream end of the first length of main to receive the other of the entry end fitting and the exit end fitting comprises the steps of providing a second parallel gas pathway from the downstream ned of the first length of main to a third length of main downstream from the downstream end of the first length of main.

* * * * *